(No Model.) 4 Sheets—Sheet 1.
G. W. MASON.
BAND SAW SHINGLE OR BOARD SAWING MACHINE.
No. 495,353. Patented Apr. 11, 1893.
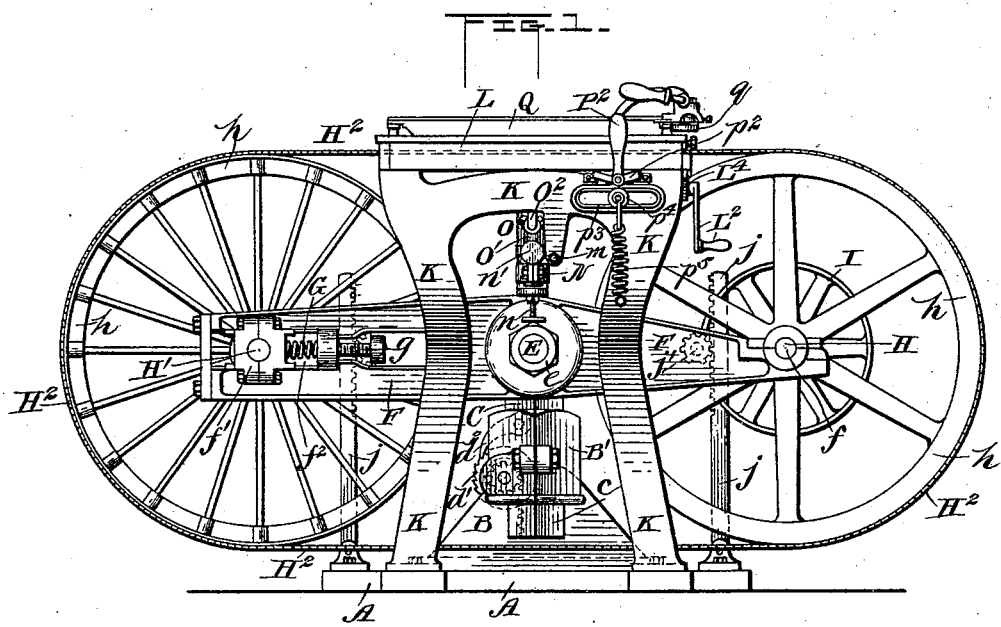
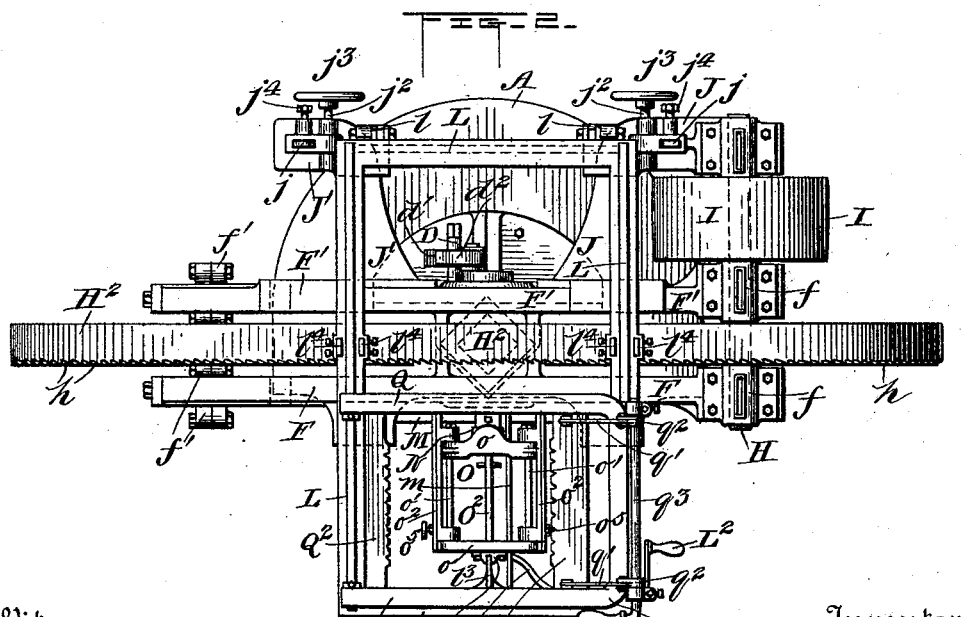
Witnesses
Severance
C. Hines
Inventor
George W. Mason
by Mason Fenwick Lawrence
his
Attorneys

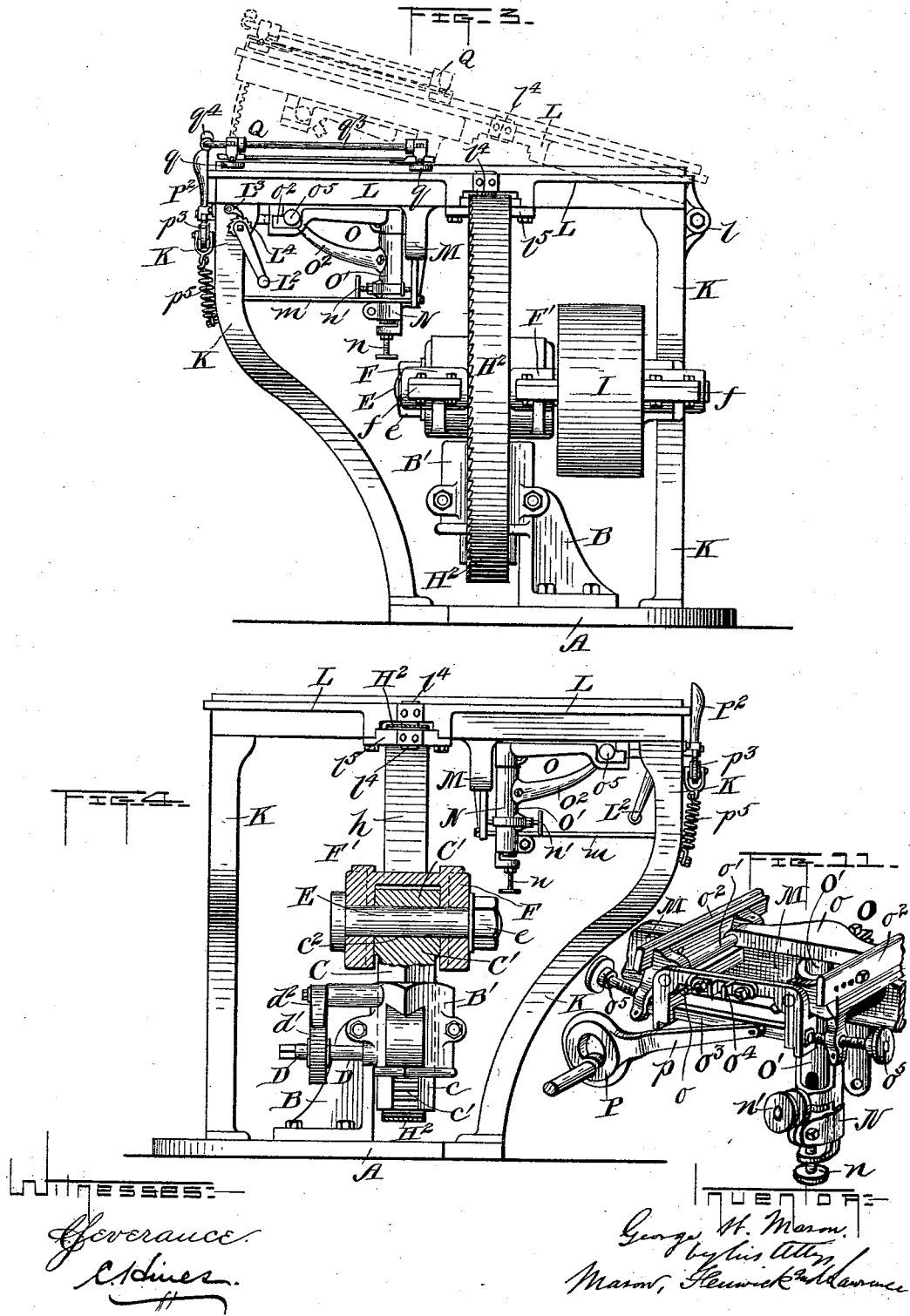

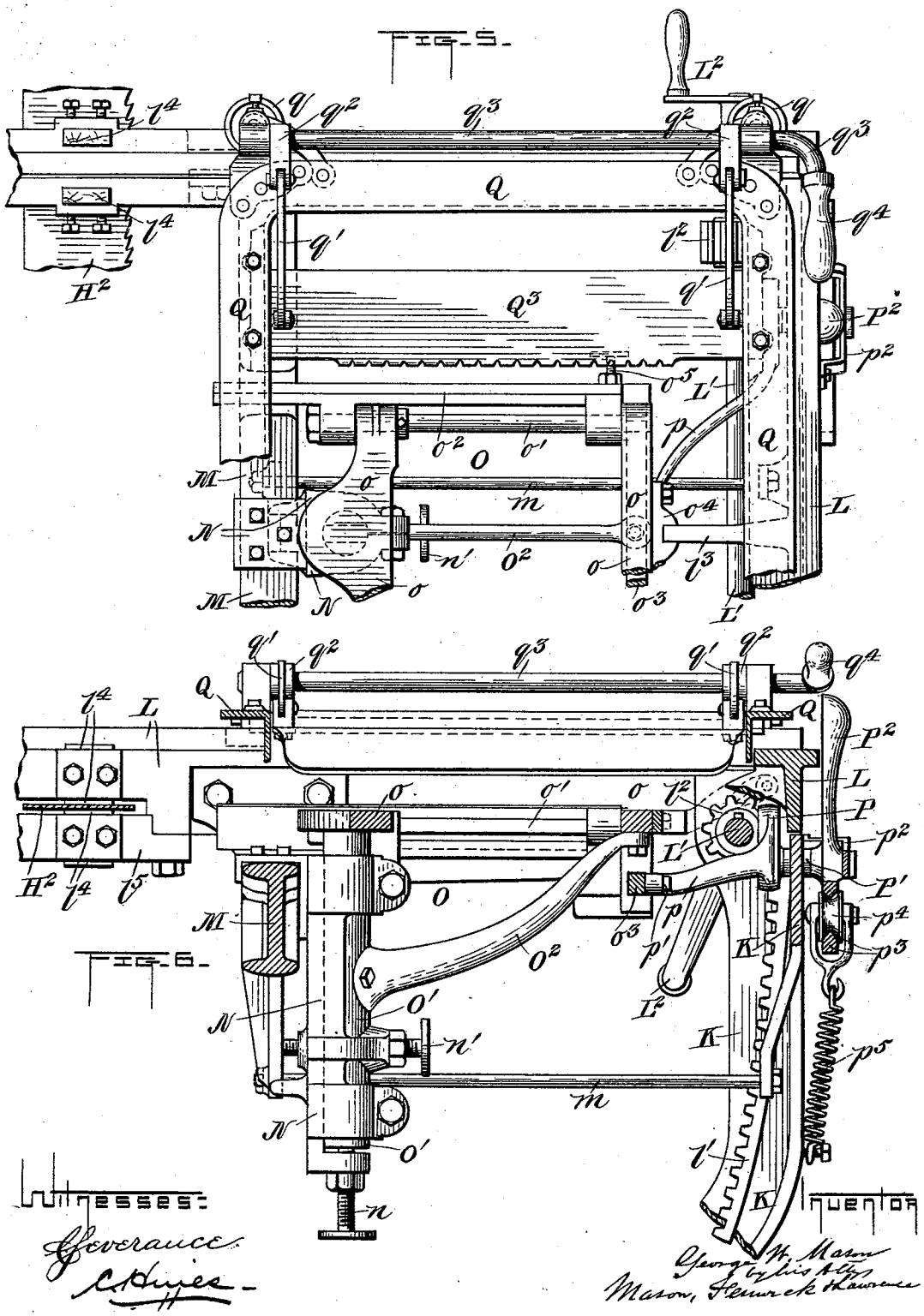

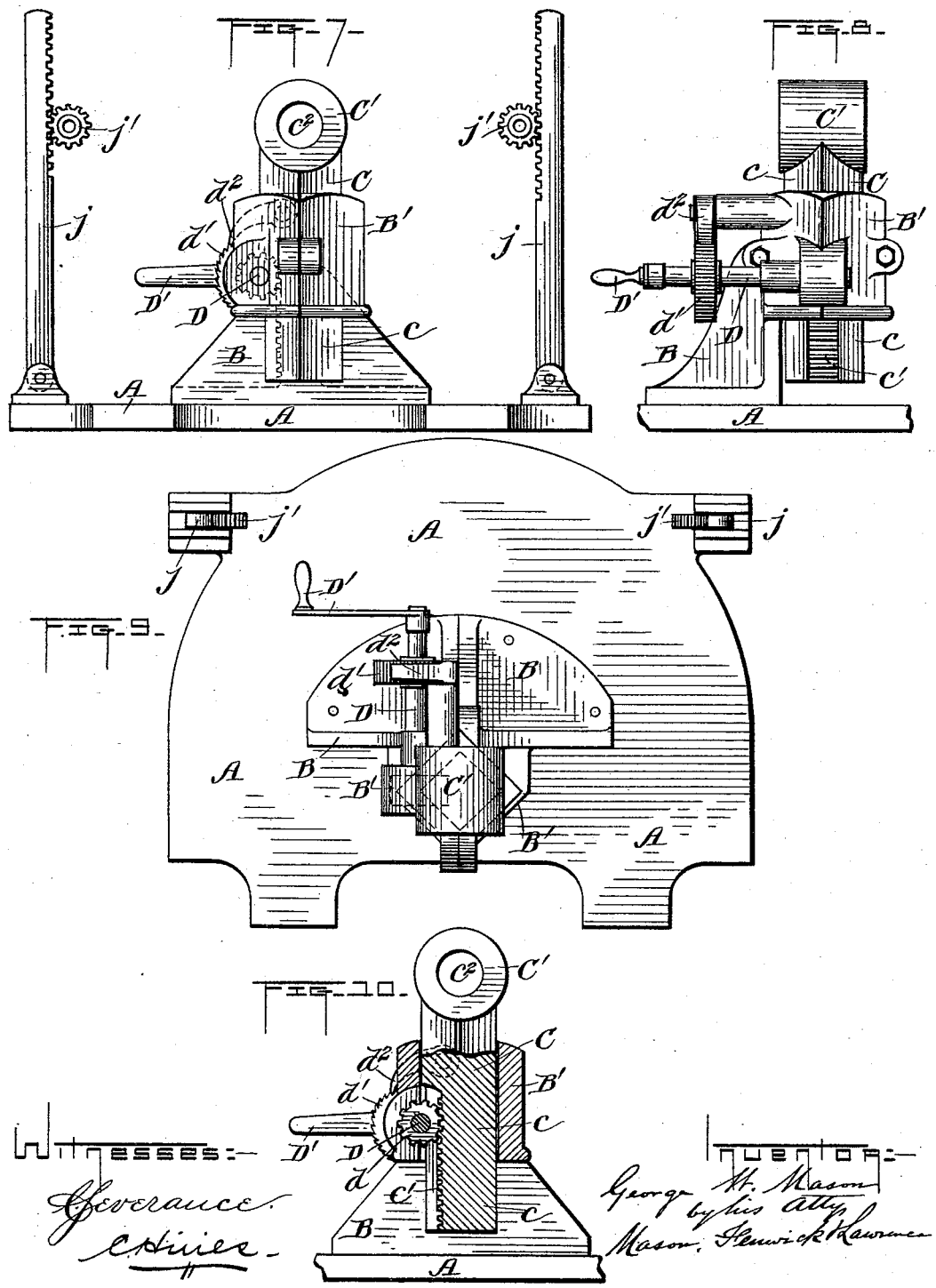

UNITED STATES PATENT OFFICE.

GEORGE W. MASON, OF EAU CLAIRE, WISCONSIN.

BAND-SAW SHINGLE OR BOARD SAWING MACHINE.

SPECIFICATION forming part of Letters Patent No. 495,353, dated April 11, 1893.

Application filed May 10, 1892. Serial No. 432,489. (No model.)

*To all whom it may concern:*

Be it known that I, GEORGE W. MASON, a citizen of the United States, residing at Eau Claire, in the county of Eau Claire and State of Wisconsin, have invented certain new and useful Improvements in Band-Saw Shingle or Board Sawing Machines; and I do hereby declare the following to be a full, clear, and exact description of the invention, such as will enable others skilled in the art to which it appertains to make and use the same.

My invention relates to band saw shingle and board sawing machines, and consists in certain constructions and combinations of parts as will be hereinafter described and claimed.

In the drawings Figure 1 is a front elevation of my improved shingle and board sawing machine. Fig. 2 is a top plan view of the same. Fig. 3 is an elevation of one end of the same, showing in dotted lines the hinged frame in its raised position. Fig. 4 is an elevation of the other end of the machine, parts being shown in section. Fig. 5 is an enlarged broken top view of a portion of the machine, showing specially the shingle bolt-tilting mechanism. Fig. 6 is an enlarged vertical sectional view, showing more particularly the tilting mechanism. Fig. 7 is a front elevation of the frame carrier and its adjusting mechanism. Fig. 8 is an end elevation of the same, parts being broken away. Fig. 9 is a plan view of the parts shown in Fig. 7. Fig. 10 is a vertical section, showing the rack and pinion mechanism of the frame carrier. Fig. 11 is a detail perspective view of the tilt-table mechanism.

A in the drawings represents the base plate of my band saw, shingle and board sawing machine. Bolted to the base plate A is an upright support B, upon the upper part of which is formed a housing or guide B' adapted to receive the band saw frame carrier C. The band saw frame carrier C consists of a vertical shaft $c$, preferably angular in shape and having on one side a recess provided with cog teeth forming a rack $c'$, and of a head C' with a horizontal bearing $c^2$ therein. Meshing with the teeth of the rack $c'$ is a pinion $d$ mounted upon a horizontal shaft D having bearings in the housing B'. One end of shaft D extends beyond the housing B', and has fixed upon its extended portion a ratchet wheel $d'$. The end of the shaft D is also adapted to receive a suitable handle D' for operating it and the pinion $d$, and thereby effecting the raising or lowering of the saw frame carrier C as may be desired. In order to hold the saw frame carrier at the desired height a pawl $d^2$ is pivoted to a projection on the housing B', and so arranged as to fall normally into engagement with the teeth of the ratchet wheel $d'$, and thereby hold it. Into the bearing $c^2$ a horizontal fulcrum shaft E is fitted, to which two lever frame-beams F F' are fastened by means of a head on the shaft E and a nut $e$ at the end of it. The beams F F' are arranged one at either side of the head C', and made to bear snugly against it. Each of these lever frame-beams F F' is provided at one end with a fixed transverse horizontal shaft-bearing $f$, and at the other end with a similar but adjustable bearing $f'$. The adjustable bearings $f'$ are made to slide in longitudinal guide ways $f^2$ of the lever frame-beams F F' and bear against springs G, which latter are longitudinally adjusted by means of screws $g$. In the bearings $f f'$ the shafts H H' of the band-saw drums $h$ are hung, and over these drums the band-saw H² is stretched and held taut by means of the tension of the springs G. The shaft H, which is hung in the rigid bearings $f$, is provided with a driving pulley I. On the lever frame beam F' are lateral frame extensions J J'. The part J extends far enough to have in it another bearing for the shaft H, upon which the driving pulley I is hung. Through apertures in the frame extensions J J' extend upright rack-bars $j$ which are pivoted at their lower ends in brackets bolted to the base plate A. Pinions $j'$ are arranged upon these frame extensions J J' in such a manner as to mesh with the teeth of the rack bars $j$, the shafts $j^2$ of said pinions having at their outer ends operating hand wheels $j^3$. By means of these hand wheels, pinions and rack bars, the saw frame may be tilted when it is desired to saw material of a tapering sectional area. Clamp screws $j^4$ are provided upon the frame extensions J J', so that the saw may be held fixed at any angle to which it has been moved by the pinions $j'$.

In order to be able to handle shingle bolts, and saw shingles in an efficient and expeditious way, mechanism is further provided which will now be described.

Rising from the base plate A, are standards K, forming a support upon which is placed the hinged frame L, it being hinged at the back of the machine by the hinges $l$. The forward edge of the frame L rests upon the supports or standards K and is provided with a slightly curved rack bar $l'$, which engages with a pinion $l^2$ mounted on a horizontal shaft $L'$. This shaft $L'$ is journaled in the standards K, and is actuated by a crank handle $L^2$, and controlled by a pawl $L^3$ pivoted to the side of the standards K, and the ratchet wheel $L^4$ upon said shaft. Thus it will be seen that, by means of the pinion $l^2$, and rack $l'$, the forward end of the frame L may be raised, the hinges $l$ at the rear of the frame allowing this movement. A cross piece or beam M braced by the bolt $m$ is bolted to the frame L a little forward of the saw, and to the central part of this cross piece is fastened a sleeve shaped piece or holder N which supports the tilt-table mechanism O, said mechanism consisting of a vertical shaft $O'$, adjustably mounted in the holder N, and having a brace arm $O^2$. Upon the upper ends of the shaft $O'$ and arm $O^2$, are fastened cross pieces $o$ of the tilt-table, through the opposite ends of which pass pivotal rods $o'$. Pivotally attached to these rods $o'$ are tilt-runners $o^2$ which support the shingle bolt, and when properly operated serve to tilt the bolt from side to side to the desired angle. In order to operate the tilt-runners, a sliding bar $o^3$ is provided, said bar sliding laterally in bearings in the forward cross piece $o$, and its ends coming in contact with the tilt-runners $o^2$, at one side or the other of the tilt-table, accordingly as it may be slid to the right or the left, and thus raising one tilt-runner or the other. An adjustment of the tilt-runners $o^2$ is provided for, by means of the set screws $o^5$, so that the tilt runners $o^2$ may be moved to a greater or less degree, so as to vary the angle of the shingle. The screws $o^5$ pass through the back end of tilt runners $o^2$, resting and working on the end of the sliding bar $o^3$, said sliding bar being operated by the eccentric P which raises and lowers the tilt runners $o^2$ alternately, thus making thick and thin ends of the shingle or piece being cut from the block. The eccentric P is pivotally attached at $p'$ to an arm $p$. The eccentric P is mounted on the inner end of a short shaft $P'$ journaled in the standards K, the outer end of said shaft having an actuating hand lever $P^2$, the movement of which lever is limited by bracket $p^2$. At the lower end of the lever $P^2$ and integral with it is formed an elongated slotted piece $p^3$, in which plays a roller $p^4$, said roller being connected to the standards K by a spring $p^5$. The office of the spring and roller is to hold the hand lever $P^2$ normally in a vertical position and thereby keep the tilt-table normally in a horizontal plane, the elongated slot $p^3$ admitting of an easy movement of the hand lever $P^2$ when it is desired to tilt the bolt to the right or left. At the lower end of the holder N is a set screw $n$, upon which rests the shaft $O'$. By means of the set screw $n$, the tilt table can be adjusted higher or lower as may be desired, to vary the thickness of the shingles to be sawed. The holder N also has an adjusting screw $n'$ for leveling the block table. This screw passes through a slot in shaft $O'$ and does not in any way operate on said shaft. The screw support or holder is a part of the sleeve N, and the back end of the screw works against a projection on the center cross bar M, thereby raising or lowering the back end of the block support to level the same, or adjust it as required. The front end, or that end of the said block support, next to the saw, is held in place by being suitably connected to the cross bar M. The sleeve N which holds shaft $O'$ is split and held together with clamp screws as shown in Fig 6, and by this means shaft $O'$ is held in position after being located by screw $n$, when it has been adjusted to the proper height. To steady the tilt-table an arm or projection $l^3$ is formed upon the hinged frame L, which fits into a notched piece $o^4$ bolted to the front cross piece $o$, all being so arranged as to admit of the vertical adjustment of the tilt-table, while preventing lateral movement of the same.

The bolt from which the shingles are to be sawed rests upon the tilt-table and is intended to be pushed along the tilt-runners $o^2$ toward the band saw. To accomplish this end, a frame Q, preferably of light angle iron, is provided, the same adapted to slide upon runners on the top of the hinged frame L, rollers $q$ on the frame Q facilitating said movement. On one side of the frame Q is a fixed jaw $Q^2$, while upon the opposite side is a sliding jaw $Q^3$, which slides in ways formed in the frame Q. The sliding jaw $Q^3$ is moved by links $q'$ pivoted to arms $q^2$ which are fastened to a horizontal rock-shaft $q^3$ journaled in the frame Q. At one end of the rock shaft $q^3$ is a handle $q^4$, to which hand power is applied when it is desired to move the sliding jaw $Q^3$.

The band saw $H^2$ passes through guides $l^4$ in the hinged frame L. These guides are pieces of wood bolted in the frame L above and below the saw blade. When it is desired to remove the saw, the lower guides $l^4$ and the pieces $l^5$ which hold them are removed, together with brace bolt $m$, whereupon the hinged frame L is raised by means of its rack $l'$ and pinion $l^2$, as shown by dotted lines in Fig. 3, thus permitting ready access to the saw, while opportunity to remove or adjust it is allowed. This provision for adjusting or removing the band saw is very important.

The operation of sawing the shingles is as follows: The bolt of wood is placed upon the tilt runners $o^2$, the sliding jaw first being retracted by turning the handle $q^4$ upright. Then by means of the lever $p^2$ the tilt-runners $o^2$ are placed at the proper angle to give the right inclination to the bolt, and the sliding jaw $Q^3$ is immediately caused to clamp the bolt between itself and the fixed jaw $Q^2$, by movement of the handle $q^4$. Now, the sliding frame Q is pushed from the operator toward the back of the machine until the saw has cut through the bolt. The frame Q is then retracted, the sliding jaw $Q^3$ withdrawn, thus allowing the bolt to drop upon the tilt-runners which are again adjusted to the proper position for the next cut. This operation is repeated until the bolt has been entirely cut into shingles, when a new one may be taken and operated upon in like manner.

The shingle machine herein described, by having its band saw mounted on lever frame beams which are adjustable by rack $c'$, and pinions $d$ controlled by ratchet $d'$, can have its saw adjusted to the greatest nicety in respect to its guides; and when it is desired to use the machine for sawing boards of taper form, the hinged frame L, carrying the shingle bolt tilting mechanism, can be raised out of the way, and a suitable guide and supporting table piece, for boards, placed upon the standards K; and when the machine is thus utilized for sawing boards the racks $j$ and pinions $j'$ can respectively be utilized for operating them so as to give the beams and saw an inclination, either right or left, it only being necessary to release both of the clamp screws of the pinions.

The machine by having the shingle bolt-tilting mechanism applied on a hinged frame which carries the saw guides, is rendered very convenient for use in connection with the band saw, as facilities are afforded, when the frame is adjusted out of relation to the saw, for applying the saw to or removing it from its drums, and also convenience for manipulating the saw afforded.

What I claim as my invention is—

1. The combination with a suitable support for a band saw mechanism and a shingle bolt tilting mechanism, of the lever frame beams, saw drums, band saw, hinged frame, saw guides on said frame, means for operating the saw and adjusting the beams, shingle bolt holding and tilting mechanism, means for tilting, adjusting and controlling the shingle bolt-holding and tilting mechanism, and means for operating said mechanism and the hinged frame, substantially as described.

2. In combination with the band saw, and the supporting frame for said saw and for a bolt tilting mechanism, of a hinged frame L, divisible saw guides $L^4$ $L^5$ attached to the hinged frame, and the removable bolt $m$, substantially as and for the purpose described.

3. In combination with a suitable supporting frame, the lever frame beams carrying the saw drums and the band saw, a band saw, means for operating the saw, a frame carrier having rack teeth, a shaft carrying a pinion working in said teeth, pivoted rack bars, and shafts having pinions working in said rack bars, substantially as described.

4. In combination with a suitable supporting frame, the lever frame beams, central, adjusting lever frame beam-carrier, provided with rack teeth, a pinion working in said rack teeth, a band saw, drums for supporting the saw, one of which has adjustable yielding bearings, a shingle-bolt holding and tilting mechanism supported by standards of the supporting frame, said mechanism comprising tilt runners, devices for tilting said runners, devices for operating the tilting devices; a sliding, bolt-holding and carrying frame; means whereby to operate said frame and the bolt holding mechanism; a hinged frame supporting the said bolt carrying frame; means for raising the hinged frame, and divisible saw guides attached to said hinged frame, the lower portion of each guide being removable, all substantially as described.

5. In a band saw shingle and board sawing machine, the combination with the band saw carrier frame, its support, and a band saw, of the standards K on said support, hinged frame L, curved rack bar $l'$, horizontal shaft $L'$, pinion $l^2$ on shaft $L'$, cross piece or beam M, bolt $m$, holder N for supporting the tilt table mechanism; and the tilt table mechanism consisting of a vertical, adjustable shaft $O'$, brace arm $O^2$, cross pieces $o$, pivoted rods $o'$, adjustable tilt runners $o^2$, sliding bar $O^3$, set screws $o^5$, hand lever $P^2$, slot $P^3$, set screw $n'$, adjusting screw $n$, arm $l^3$, and notched piece $o^4$, substantially as described.

In testimony whereof I hereunto affix my signature in presence of two witnesses.

GEORGE W. MASON.

Witnesses:
JNO. E. GALLIGAN,
FRANK G. BLAIR.